United States Patent

Lanning

[15] 3,652,841

[45] Mar. 28, 1972

[54] APPARATUS FOR CONVERTING NUMBERS BETWEEN POSITIVE AND NEGATIVE RADICES

[72] Inventor: Walter C. Lanning, Plainview, N.Y.

[73] Assignee: Sperry Rand Corporation

[22] Filed: June 23, 1970

[21] Appl. No.: 49,211

[52] U.S. Cl. ........................235/155, 340/347 DD, 235/175

[51] Int. Cl. ..................................................H03k 13/243

[58] Field of Search.............235/155, 173, 175; 340/347 DD

[56] References Cited

OTHER PUBLICATIONS

G. Songster, " Negative-Base Number-Representation Systems," IEEE Trans. on Elec. Comp., June, 1963; pp. 274–277.

L. Wadel, " Conversion From Conventional To Negative-Base Number Representation," IRE Trans. on Elec. Comp., December, 1961; p. 779.

D. Dietmeyer, " Conversion From Positive To Negative And Imaginary Radix," IEEE Trans. on Elec. Comp., February, 1963; pp. 20–22.

*Primary Examiner*—Maynard R. Wilbur
*Assistant Examiner*—Charles D. Miller
*Attorney*—S. C. Yeaton

[57] ABSTRACT

Apparatus for converting numbers between positive and negative radices comprising a plurality of EXCLUSIVE OR logic circuits responsive to the digits of the numbers to be converted, respectively. A plurality of AND logic gates responsive to the digits of the even orders of the numbers, respectively, and a plurality of OR logic gates responsive to the digits of the odd orders of the numbers, respectively, are included. Each AND gate and each EXCLUSIVE OR circuit associated with a particular even order is responsive to the output of the OR gate associated with the odd order preceding the particular even order. Each OR gate and each EXCLUSIVE OR circuit associated with a particular odd order is responsive to the output of the AND gate associated with the even order preceding the particular odd order.

6 Claims, 6 Drawing Figures

INVENTOR
WALTER C. LANNING
BY
H P Terry
ATTORNEY

INVENTOR
WALTER C. LANNING
BY
H P Terry
ATTORNEY

INVENTOR
WALTER C. LANNING
BY
ATTORNEY

APPARATUS FOR CONVERTING NUMBERS BETWEEN POSITIVE AND NEGATIVE RADICES

BACKGROUND OF THE INVENTION

1. Field of the Invention

The invention pertains to radix converters and more particularly to apparatus for converting the digits of numbers between positive and negative radices in parallel.

2. Description of the Prior Art

It is well known in accordance with the discipline of number theory that a number can be expressed by the juxtaposition of the coefficients of the orders of the implied radix. For example, the digits of an integer N may be expressed as:

$$N = a_{n-1}a_{n-2} \cdot \cdot \cdot a_1 a$$

where the $a_i$'s represent the aforesaid coefficients. It is understood that this number representation is significant only when a radix is assigned to the number system. Hence, the above number representation is actually an abbreviated expression for the general numerical form:

$$N = a_{n-1}r^{n-1} + a_{n-2}r^{n-2} + \ldots + a_1r^1 + a_0r^0$$

where $r$ represents the radix of the number system utilized.

As is well understood the decimal number system, commonly utilized in the commercial and scientific disciplines, employs a radix of +10. It is furthermore appreciated that the binary number system utilized in the current digital technology has a radix of +2. Furthermore, a diversity of number systems are known for a variety of purposes that utilize a wide range of radices. These radices are usually positive.

Systems of numbers have recently been developed utilizing negative radices which systems provide unique advantages with respect to systems having positive radices. Negative radix number systems are described in detail in a series of articles entitled "Negative Radix Arithmetic" by M. P. de Regt appearing in the May through December, 1967, and January, 1968, issues of the periodical, *Computer Design*. The advantages of apparatus based on negative radix number systems are fully discussed in said articles and will not be repeated here for brevity. In particular, digital computation systems based on a number system having a negative binary radix (−2) are discussed. Computers instrumented in accordance with such systems offer significant advantages with respect to the more usual computers that utilize a number system having a positive binary radix (+2).

It may be appreciated that presently available digital computers as well as peripheral input and output equipment largely utilize the positive binary number system. In order that this existing equipment be compatible with computers based on negative binary number systems, converters for transforming numbers between positive and negative radices are required. For example, in order to utilize existing peripheral input equipment, such as card and tape readers, converters for transforming numbers from positive radices to negative radices may be required to provide input data to computers utilizing the negative binary number system. As a further example, in order to utilize existing peripheral output equipment such as printers and card punches, converters are required to transform the negative radix numbers provided by the computer into the positive radix format that may be utilized by the output devices. It may be appreciated that the bits of the input and output data are often provided in parallel fashion.

Algorithms are known for transforming positive and negative numbers, respectively, expressed in a positive radix to the equivalent numbers expressed in a negative radix. Conversely, algorithms are known for transforming numbers expressed in a negative radix to the equivalent positive and negative numbers, respectively, expressed in a positive radix. The algorithms with respect to positive and negative numbers are different from one another in accordance with the sign of the number to be converted. For example, the conversion algorithm for a positive number in a positive radix to the equivalent number in a negative radix differs from the conversion algorithm for a negative number in a positive radix to the equivalent number in a negative radix.

A converter for transforming binary numbers from a positive radix to a negative radix instrumented in accordance with the corresponding algorithms is known in the art that operates on the numbers to be converted in bit serial fashion. Additionally, serial converters are disclosed in copending patent application *Ser. No.* 49,440, Apparatus For Converting Numbers Between Positive and Negative Radices, filed on June 23, 1970, in the name of the present inventor and assigned to the present assignee. These converters are instrumented in accordance with a novel algorithm fully described in said Ser. No. 49,440.

Radix converters for transforming numbers between positive and negative radices that operate upon the digits of the numbers in parallel fashion are believed to be currently unknown in the art. It is expected that parallel radix converters which may be designed in accordance with the prior art algorithms to transform positive numbers in a positive radix to the equivalent positive numbers in a negative radix would differ from parallel converters so designed for transforming negative numbers in the positive radix to the equivalent negative numbers in the negative radix. Similarly, converters that may be designed in accordance with the prior art algorithms for transforming positive and negative numbers, respectively, from negative to positive radices would differ from one another in accordance with the signs of the numbers to be converted. Alternatively, parallel radix converters, that may be designed in accordance with the prior art algorithms, may be responsive to the sign digits of the numbers to be converted to controllably alter the circuits in accordance therewith.

It may be appreciated that although parallel converters for transforming numbers between positive and negative radices are believed currently unknown in the art, converters that may be designed in accordance with the prior art algorithms may be complex and expensive in order to implement the distinct algorithms required with respect to positive and negative numbers.

SUMMARY OF THE INVENTION

The present invention provides radix converters that operate on the input numbers in bit parallel fashion where the conversions are performed independently of the signs of the numbers to be transformed. Specifically, converters are provided that transform positive and negative binary numbers in a positive radix to equivalent numbers in a negative radix; and, conversely, converters are provided that transform positive and negative binary numbers in a negative radix to equivalent numbers in a positive radix. Converters are also provided that perform both conversions in accordance with a control signal.

It is recognized, in accordance with the present invention, that when negative numbers in a positive radix number system are expressed in radix complement form, an algorithm may be developed for converting both positive and negative numbers in a positive radix system to the equivalent numbers in a negative radix system in identically the same manner. For example, negative binary numbers which may be expressed in conventional 2's complement form may be converted to equivalent binary numbers in a −2 radix representation.

The algorithm may also be utilized in deriving converters in accordance with the present invention for transforming negative radix numbers to equivalent positive radix numbers where the numbers having negative signs are provided in radix complement form. For example, in the preferred binary converters of the present invention, the positive radix binary output numbers are provided in 2's complement form.

The algorithm is instrumented to provide preferred embodiments of converters in accordance with the present invention comprising a plurality of EXCLUSIVE OR logic circuits responsive to the digits of the numbers to be converted, respectively. A plurality of AND logic gates responsive to the digits of the even orders of the numbers, respectively, and a plurality of OR logic gates responsive to the digits of the odd orders of the numbers, respectively, are included. Each AND gate and each EXCLUSIVE OR circuit associated with a particular even order is responsive to the output of the OR gate associated with the odd order preceding the particular even order. Each OR gate and each EXCLUSIVE OR circuit associated with a particular odd order is responsive to the output of the AND gate associated with the even order preceding the particular odd order.

DESCRIPTION OF THE PREFERRED EMBODIMENTS

Figure 1:
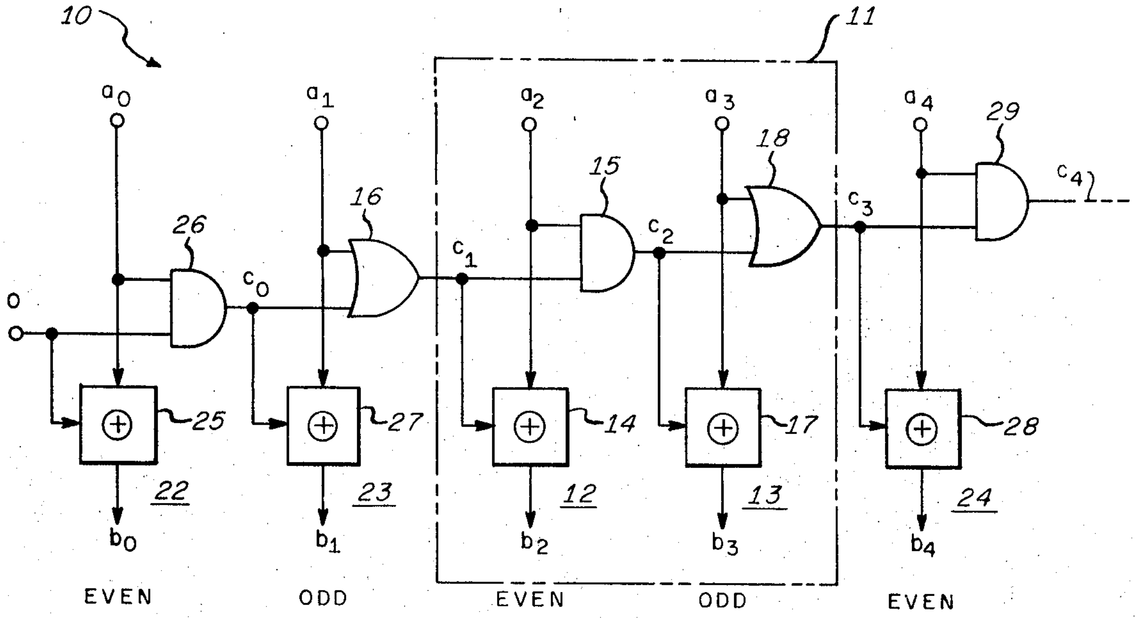
FIG. 1 is a schematic diagram of a converter for transforming binary numbers from a +2 radix to a −2 radix in accordance with the teachings of the present invention.

The algorithm used in the development of the preferred converter embodiments of the invention is fully explained in the said Ser. No. 49,440, and will not be repeated here for brevity. The significant features of the algorithm are given in terms of the conversion of binary numbers for completeness.

As previously discussed, a binary number $N$ to be converted may be expressed as:

$$N=(a_{n-1})\ 2^{n-1}+(a_{n-2})\ 2^{n-2}+\ldots+(a_1)\ 2^1+(a_0)\ 2^0$$

where an order of the number $N$ may be designated as odd or even in accordance with the exponent of the order being odd or even, respectively. For example, the bit $a_0$is an even order bit since it is the coefficient of the radix raised to the even exponent zero and the digit $a_1$is an odd order bit since it is associated with the radix raised to the odd exponent of one.

In accordance with the algorithm of the present invention, even order bits of numbers to be converted are transferred unaltered as explained in the said Ser. No. 49,440. The odd order bits are transformed to their 2's complement representations with carrys being propagated to the associated next higher even orders. It may be appreciated that in the binary number system, the 2's complement of ONE is ONE. Zero valued bits are transferred unaltered for both odd and even orders.

With regard to transformations from the +2radix to the −2 radix, negative numbers to be converted are initially transformed to their conventional 2's complement representations by any convenient means before the start of the conversion procedure.

With regard to transformations from the −2 radix to the +2 radix it is to be understood that since in negative radix number systems alternate orders have alternate signs, a carry into an order is effected as a subtraction and a borrow from an order is effected as an addition.

In accordance with the algorithm of the present invention as discussed above and in accordance with the Boolean algebraic properties of the binary number system, it may be appreciated that an odd or even bit of a number to be converted is transformed by combining the bit with the carry from the associated previous order in accordance with the EXCLUSIVE OR function. This transformation is performed for both conversions between the +2 and −2 radices irrespective of the signs of the numbers.

With regard to conversions from the +2 radix to the −2 radix, an even ordered digit may generate a carry to be propagated to the next higher order in accordance with the usual rules of binary arithmetic. Thus, an even order digit generates a carry only when the associated input digit is ONE and a carry of ONE is received from the previous order. Hence the carry generation logic circuit associated with an even order may comprise an AND gate responsive to these two bits. Similarly, an odd order digit may generate a carry in the same manner as an even order digit and, additionally, may generate a carry when the 2's complement of the associated input bit is transferred in accordance with the algorithm. Since this transfer will occur, with binary numbers, only when the associated input digit is ONE, thus causing the associated output digit to be ONE, the carry generation logic function for an odd order may comprise the Boolean sum of the AND function of the associated input digit and the previous carry with the EXCLUSIVE OR function thereof. In accordance with the well-known rules of Boolean algebra, this carry function simplifies to the OR function of the associated input digit with the previous carry.

With regard to the conversions from the −2 radix to the +2 radix, the Boolean algebraic development of the carry logic for the odd and even digits discussed above may be utilized to develop the carry generation circuits for the converse transformation. Accordingly, the carry from an even order is generated by the Boolean AND combination of the inverse of the associated input digit with the previous carry. The inverse of the digit must be utilized because of the alternating signs of the orders as previously discussed. The carry from an odd order is generated in identically the same manner as that described with respect to the +2 to −2 radix conversion.

Referring now to FIG. 1, a converter 10 implemented in accordance with the above-described algorithm for transforming binary numbers from the +2 radix to the −2 radix is illustrated. Since the circuits for instrumenting the even order transformations are identical with respect to each other and the circuits for instrumenting the odd orders are similarly identical, only the portion 11 of the converter 10 will be described for brevity. The portion 11 includes an even order stage 12 and a following odd order stage 13. The stage 12 comprises an EXCLUSIVE OR logic circuit 14 and an AND gate 15 both coupled to receive the associated even order bit $a_2$of the number to be converted as well as being coupled to receive the carry from the previous stage provided by an OR gate 16. The EXCLUSIVE OR circuit 14 provides the associated digit $b_2$of the transformed output number and the AND gate 15 provides the carry to the following stage 13.

The stage 13 comprises an EXCLUSIVE OR circuit 17 and an OR gate 18 both coupled to receive the associated odd bit $a_3$ of the number to be converted as well as the previous carry from the AND gate 15. The EXCLUSIVE OR circuit 17 provides the associated bit $b_3$of the transformed output number and the OR gate 18 provides the carry to the next higher order stage 24. It is to be noted, as previously discussed, that the next higher order stage 24 is identical to the stage 12.

It may be appreciated that the number of stages utilized in the converter 10 corresponds to the number of digits of the input number to be transformed where the even and odd pairs of adjacent stages are identical to the portion 11. Accordingly, the converter 10 may include stages 22–24 in addition to the previously described stages 12 and 13. The stages 22, 23, 12, 13 and 24 are responsive in parallel to the bits $a_0$, $a_1$, $a_2$, $a_3$, and $a_4$, respectively, of the input number in accordance with the previously described numerical designation, the stages 22, 23, 12, 13 and 24 providing the converted digits $b_0$, $b_1$, $b_2$, $b_3$ and $b_4$ of the output number, respectively.

The stage 22 comprises an EXCLUSIVE OR circuit 25 and an AND gate 26 in a manner similar to that described with respect to the stage 12, a binary ZERO signal being applied as inputs thereto for reasons to be explained. The stage 23 comprises an EXCLUSIVE OR circuit 27 and the OR gate 16 in a manner identical to that described with respect to the stage 13. Similarly, the stage 24 comprises an EXCLUSIVE OR circuit 28 and an AND gate 29.

The operation of the +2 radix to −2 radix converter 10 will be described with respect to the following example where the number 00011 in the +2 radix is transformed to an equivalent number in the −2 radix. It is understood that the number 00011 represents the quantity +3 where the two leading zeros are representative of the sign thereof. The bits 00011 may be designated as $a_4$, $a_3$, $a_2$, $a_1$ and $a_0$, respectively, as previously explained and may be applied as inputs to the stages 24, 13, 12, 23 and 22, respectively, of the converter 10.

Although the conversion of the digits of the number $a_4a_3a_2a_1a_0$ occur essentially simultaneously, the conversion operation will be described sequentially from the least significant digit $a_0$ to the most significant digit $a_4$ for clarity. The digit $a_0$ having the value of ONE is transformed to the digit $b_0$ having the value of ONE by the EXCLUSIVE OR circuit 25 since the carry input to the circuit 25 has a binary ZERO continuously applied thereto. Since the continuous ZERO carry signal is also applied to the carry generating AND gate 26, the gate 26 provides a ZERO carry signal to the stage 23.

The EXCLUSIVE OR circuit 27 of the stage 23 transforms the digit $a_1$ having the value ONE to the digit $b_1$ having the value ONE, as required, since the input thereto from the AND gate 26 is representative of a ZERO carry. Since the input digit $a_1$ has a value of ONE, the OR gate 16 provides a carry signal of ONE to the next following stage 12.

With the digit $a_2$, having the value ZERO, and the carry from the OR gate 16, having the value of ONE, applied to the EXCLUSIVE OR circuit 14 of the stage 12, the circuit 14 provides the output digit $b_2$ having the value ONE as required. Since the input digit $a_2$ is ZERO, the AND gate 15 provides a signal representative of no carry to the stage 13 as required in accordance with the conversion algorithm previously described.

In a manner similar to that described with respect to the previous stages, the EXCLUSIVE OR circuit 17 of the stage 13 provides the output digit $b_3$ of ZERO in response to the input digit $a_3$ of ZERO and the OR gate 18 provides a signal to the stage 24 representative of no carry as required.

The stage 24 provides the output digit $b_4$ of value ZERO in response to the input digit $a_4$ of value ZERO in a manner similar to that described with respect to the preceding stages of the converter 10.

Thus it may now be appreciated that the converter 10 has transformed the binary number 00011 in the +2 radix, which number is representative of the quantity +3, to the number 00111 in the −2 radix, which quantity is similarly representative of the quantity +3, as may be readily verified in accordance with the teachings of the said de Regt articles.

The converter 10 may also be utilized to convert negative quantities in the +2 radix to the equivalent negative quantities in the −2 radix when the input negative quantities are expressed in their 2's complement representations as previously discussed. The binary number −00011 (−3) in the +2 radix may be transformed to its 2's complement representation of 11101 (−3) by any conventional means not shown. The digits 11101 may then be applied respectively to the stages 24, 13, 12, 23 and 22 of the converter 10 to provide the output number 01101 in a manner similar to that described with respect to the preceding example. It may readily be verified that the number 01101 is representative of the quantity −3 in the −2 radix number system.

Figure 2:
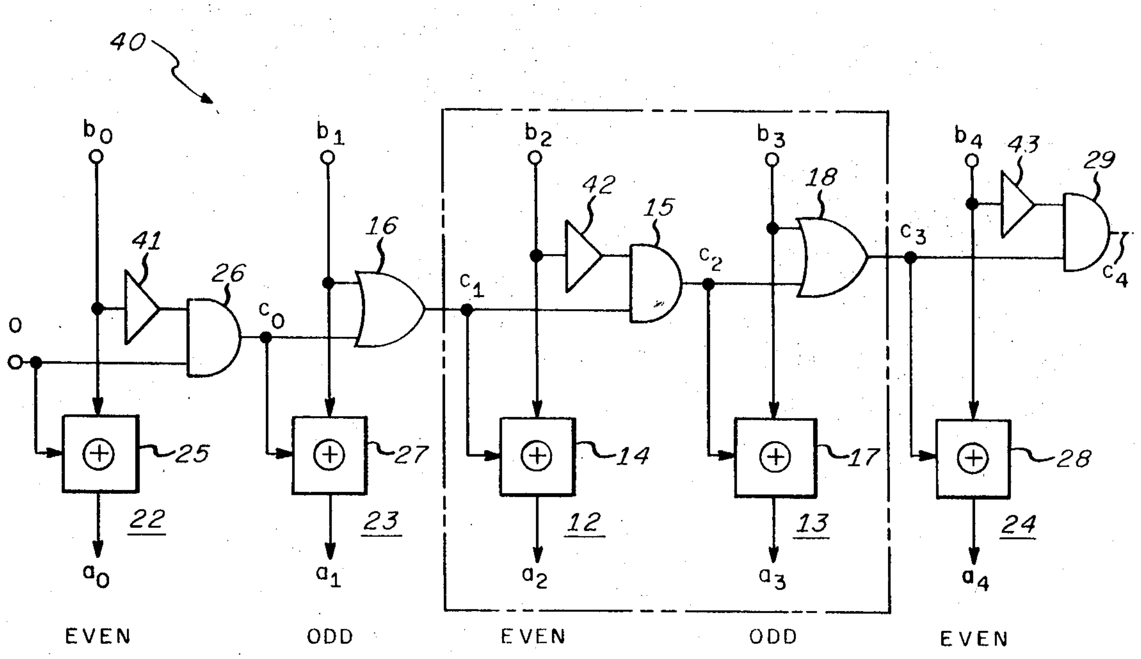
FIG. 2 is a schematic diagram of a converter for transforming binary numbers from a −2 radix to a +2 radix in accordance with the teachings of the present invention.

Referring now to FIG. 2, where like reference numerals indicate like components with respect to FIG. 1, a converter 40 is illustrated for transforming positive and negative numbers from the −2 radix to the +2 radix. The structure of the converter 40 is similar to that of the converter 10 with the exception that the AND gates of the even stages are responsive to the inverses of the respective input digits. For example, the input digit $b_0$ of the stage 22 is applied to the AND gate 26 via an inverter 41. Similarly, converters 42 and 43 are included in the stages 12 and 24 of the converter 40.

The operation of the converter 40 is similar to that of the converter 10 and may conveniently be understood by consideration of the converses of the examples previously given. For example, the quantity +3 in the −2 radix may be transformed to the quantity +3 in the +2 radix. The digits 00111, designated as $b_4$, $b_3$, $b_2$, $b_1$ and $b_0$, are applied to the stages 24, 13, 12, 23 and 22, respectively, which provide the digits of the output number 00011, respectively, in accordance with the Boolean algebraic functions instrumented by the components of the converter 40 in a manner similar to that described with respect to the converter 10.

In a like manner, the number 01101 (−3 in the −2 radix) may be transformed to the number 11101 (−3 in the +2 radix) by the converter 40. Thus it may now be appreciated that the converter 40, illustrated in FIG. 2, transforms positive and negative −2 radix numbers into their equivalent +2 radix representations where the negative quantities are provided in 2's complement form.

Figure 3:
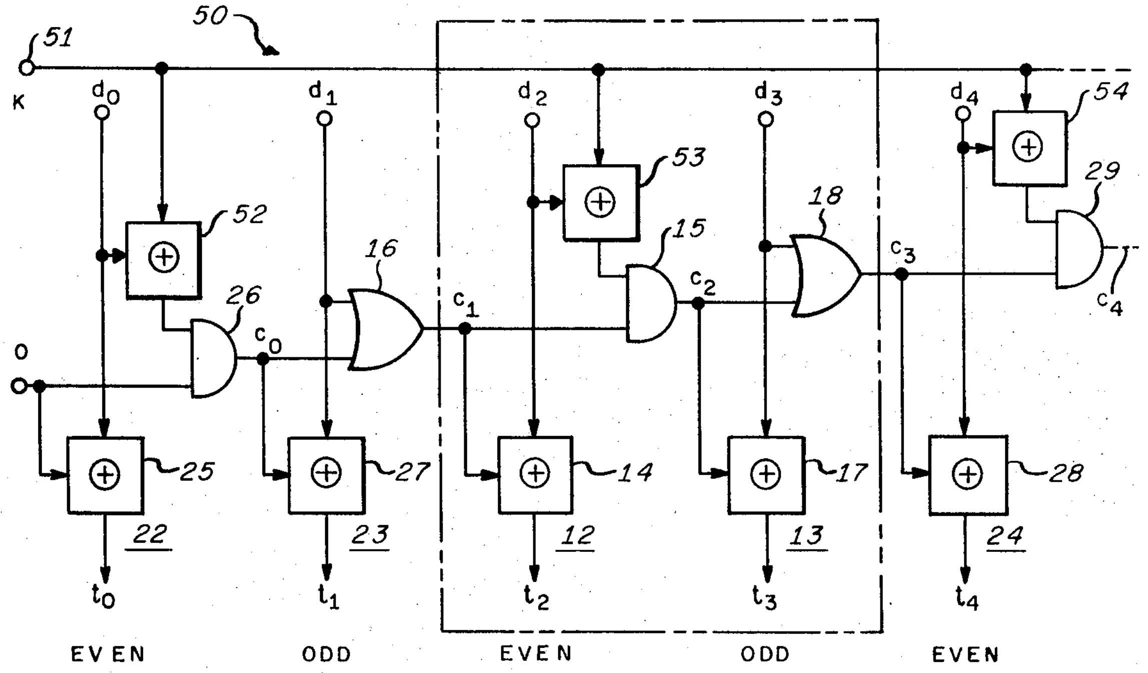
FIG. 3 is a schematic diagram of a converter for transforming binary numbers between +2 and −2 radices selectively in accordance with a control signal.

Referring now to FIG. 3, where like reference numerals indicate like components with respect to FIG. 1, a converter 50 is illustrated for performing transformations upon binary numbers between +2 and −2 radices in accordance with a control signal K applied at an input terminal 51. When the signal K is in the binary ZERO state, a +2 to −2 radix conversion is effected and, conversely, when the signal K is in the ONE state, a −2 to +2 radix conversion is performed.

The structure of the converter 50 is similar to that described with respect to FIGS. 1 and 2 except that the input bit $d_0$ is applied to the AND gate 26 via an EXCLUSIVE OR circuit 52. The EXCLUSIVE OR circuit 52 is also responsive to the control signal K. The converter 50 similarly includes an EXCLUSIVE OR circuit 53 for applying the input bit $d_2$ to the AND gate 15 and an EXCLUSIVE OR circuit 54 for applying the input bit $d_4$ to the AND gate 29. The EXCLUSIVE OR circuits 53 and 54 are also responsive to the control signal K.

It may thus be appreciated that when the control signal K is in the binary ZERO state, the EXCLUSIVE OR circuits 52–54 provide the associated input bits to the associated AND gates unmodified in a manner equivalent to that described with respect to the converter 10 of FIG. 1. Hence, when the control signal K is in the binary ZERO state, the converter 50 transforms numbers from the +2 radix to the −2 radix in a manner similar to that described with respect to FIG. 1.

Conversely, when the control signal K is in the binary ONE state, the EXCLUSIVE OR circuits 52–54 provide the associated input bits to the associated AND gates inverted in a manner equivalent to that described with respect to the converter 40 of FIG. 2. Hence, when the control signal K is in the binary ONE state, the converter 50 transforms numbers from the −2 radix to the +2 radix in a manner similar to that described with respect to FIG. 2.

It may now be appreciated with respect to FIGS. 1, 2 and 3 that since a binary ZERO signal is applied continuously to the EXCLUSIVE OR circuits 25 and to the AND gates 26 and since the AND gates 26 provide signals to the EXCLUSIVE OR circuits 27 and to the OR gates 16, the EXCLUSIVE OR circuits 25 and 27 and the OR gates 16 may be replaced by simple conductors while the AND gates 26 may be eliminated. Thus an economy of components may be effected. A further economy of components may be effected by instrumenting the circuits of the converters 10, 40 and 50 by means of NAND logic.

Figure 4:
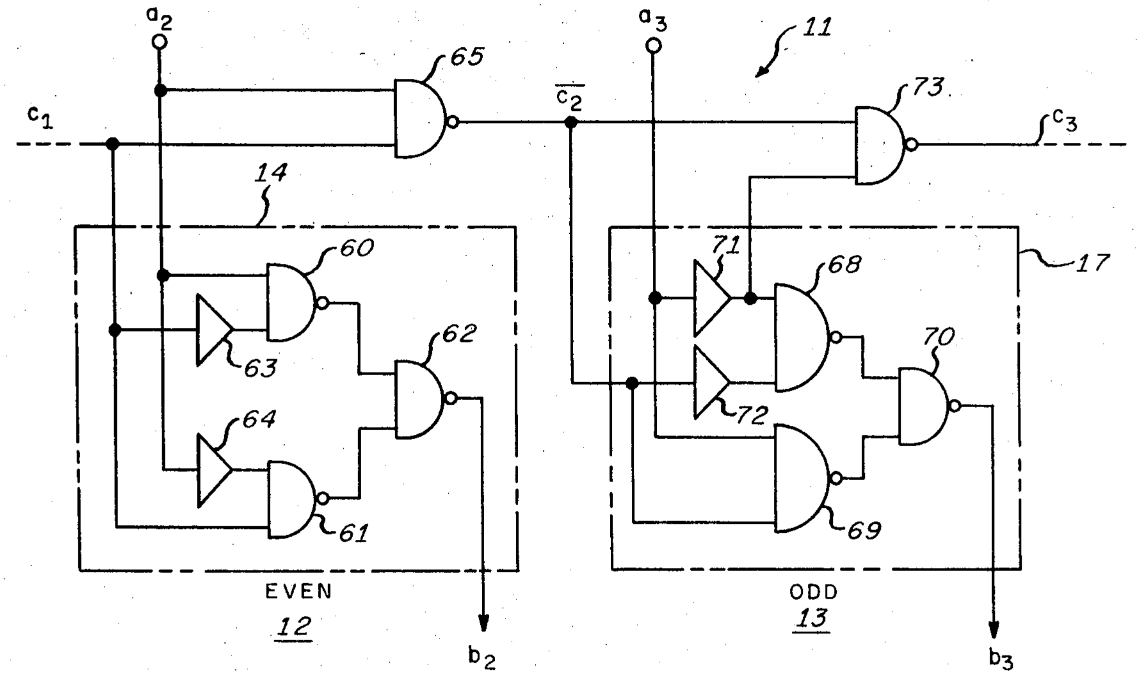
FIG. 4 is a detailed schematic logic diagram of a preferred instrumentation of a portion of the converter of FIG. 1.

Referring now to FIG. 4, in which like reference numerals indicate like components with respect to FIG. 1, a preferred NAND instrumentation of the stages 12 and 13 of the converter 10 are illustrated. The EXCLUSIVE OR circuit 14 is comprised of NAND gates 60–62 and inverters 63 and 64 which are interconnected in a conventional manner to provide the EXCLUSIVE OR function of the digit $a_2$ with the carry $c_1$ at the output of the NAND gate 62. The carry AND gate 15 (FIG. 1) is instrumented by means of a NAND gate 65. The NAND gate is coupled to receive the input digit $a_2$ and the carry signal $c_1$ hence conjunctively combining the signals to provide the inverse of the carry signal $c_2$to the stage 13.

The EXCLUSIVE OR circuit 17 of the stage 13 is comprised of NAND gates 68–70 and inverters 71 and 72 interconnected in a conventional manner to provide the EXCLU- SIVE OR function of the digit $a_3$ with the carry $c_2$ at the output of the NAND gate 70. The carry OR gate 18 (FIG. 1) is instrumented by means of a NAND gate 73. The NAND gate 73 is coupled to receive the inverse of the input digit $a_3$ via the inverter 71 and the inverse of the carry signal $c_2$ from the NAND gate 65. Hence in accordance with the well-known de Morgan's Theorum of Boolean Algebra, the NAND gate 73 provides the logical sum of the digit $a_3$ and the carry $c_2$ as required.

Figure 5:
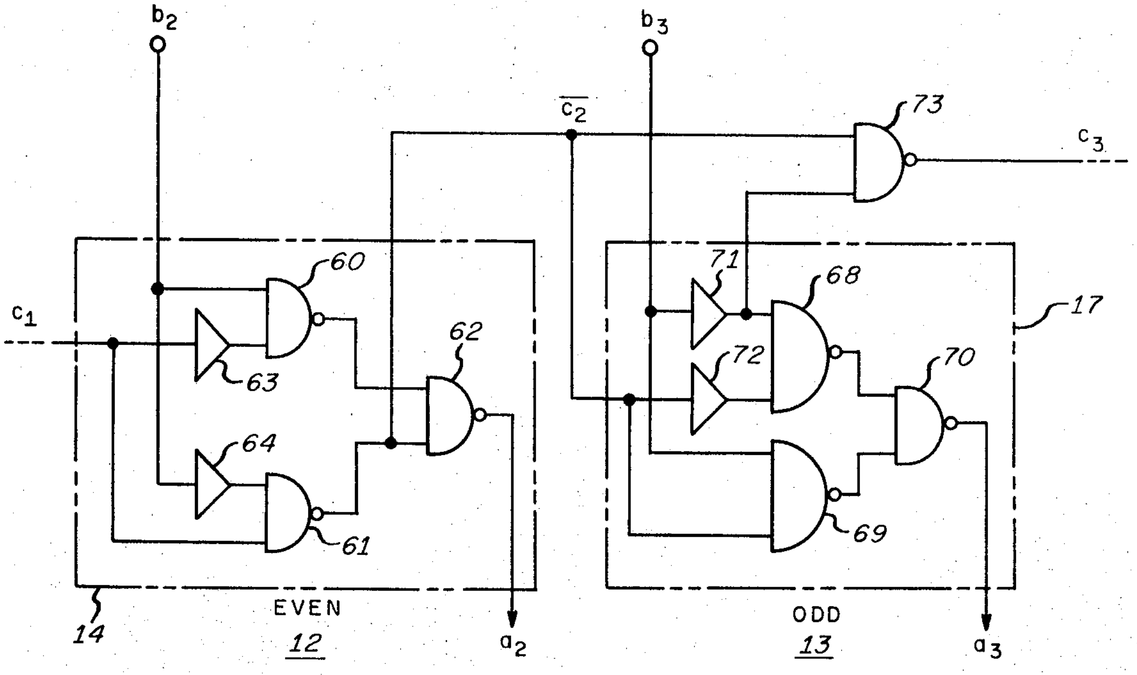
FIG. 5 is a detailed schematic logic diagram of a preferred instrumentation of a portion of the converter of FIG. 2.

Referring now to FIG. 5, in which like reference numerals indicate like components with respect to FIG. 4, a preferred NAND instrumentation of the stages 12 and 13 of the converter 40 are illustrated. The EXCLUSIVE OR circuit 14 is comprised of NAND gates and inverters in a manner identical to that described with respect to FIG. 4. Since the carry signal from the stage 12 is obtained in accordance with the logical AND function of the inverse of the input digit with the previous carry, as formerly discussed, the NAND gate 61 of the EXCLUSIVE OR circuit 14 may provide this carry signal. Thus an economy of components is effected since the NAND gate 61 performs its required function in the EXCLUSIVE OR circuit 14 and also provides the required carry signal. Hence the AND gate 15 and the inverter 42 (FIG. 2) may be eliminated. The NAND gate 61 in fact provides the inverse of the carry $c_2$ as required by the EXCLUSIVE OR circuit 17 of the stage 13.

The EXCLUSIVE OR circuit 17 of the stage 13 is comprised of NAND gates and inverters in a manner similar to that described with respect to FIG. 4. In addition, the NAND gate 73 provides the required carry signal $c_3$ in the manner previously described with respect to FIG. 4.

Figure 6:
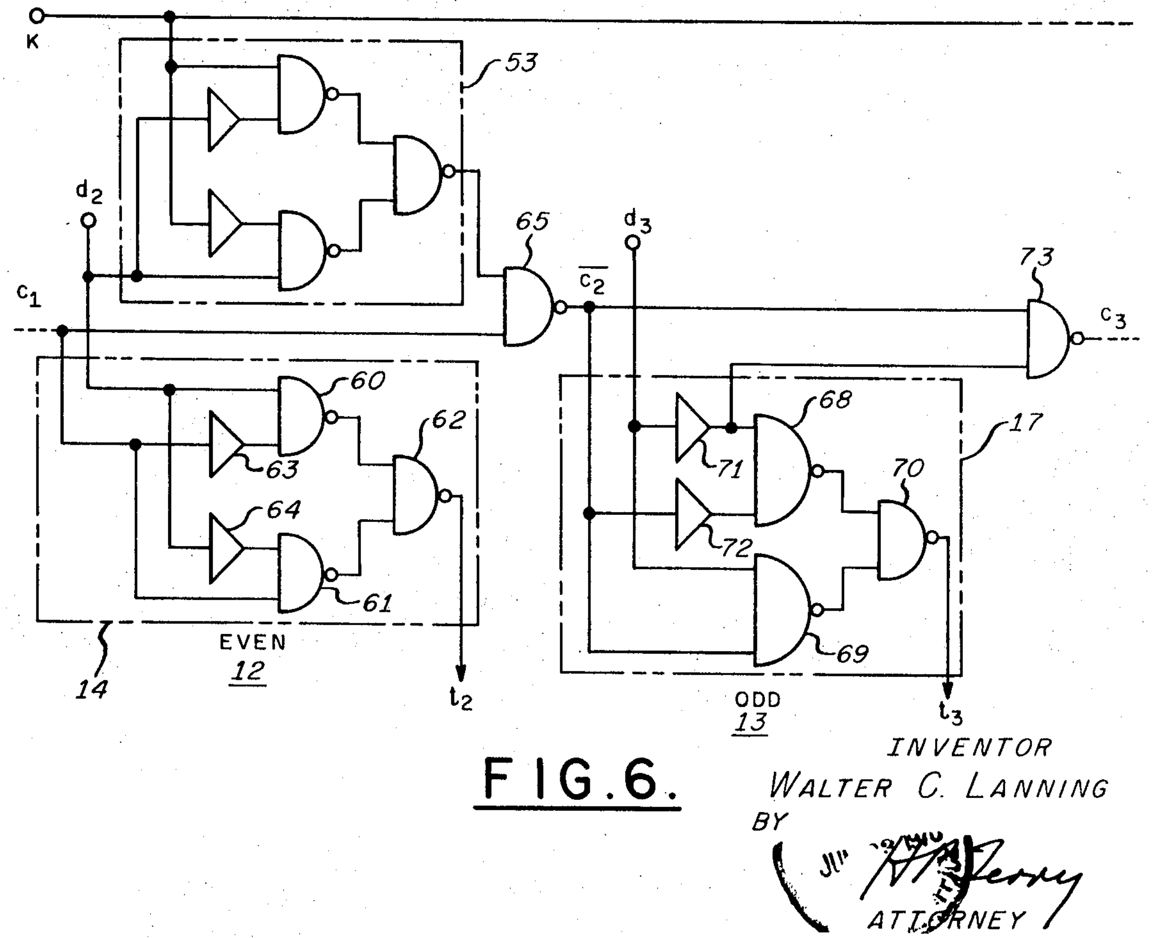
FIG. 6 is a detailed schematic logic diagram of a preferred instrumentation of a portion of the converter of FIG. 3.

Referring now to FIG. 6 in which like reference numerals indicate like components with respect to FIG. 4, the EXCLUSIVE OR circuits 14 and 17 and the NAND gate 73 are comprised of NAND gates and inverters in the manner previously described with respect to FIG. 4. The EXCLUSIVE OR circuit 53 is comprised of NAND gates and inverters in a manner identical to that described with respect to the EXCLUSIVE OR circuit 14 and provides the EXCLUSIVE OR function of the control signal K and the digit $d_2$ to the NAND gate 65 in the manner and for the reasons previously discussed with respect to FIG. 3.

It may now be appreciated that the present invention provides converters for transforming, in bit parallel fashion, both positive and negative binary numbers between the positive and negative radices independently of the signs of the numbers to be converted.

It may further be appreciated that when the negative radix number to be converted represents a positive quantity, the output number is conveniently provided in sign plus magnitude format. When the negative radix number to be converted is representative of the negative quantity, the output number is conveniently generated in the 2's complement form.

It may further be appreciated that the converters of the present invention accept as inputs the conventional 2's complement form of number representation. It may also be appreciated that a bi-directional radix converter is provided that conveniently provides radix transformations in accordance with the state of a control signal, which converter is readily adaptable to the Large Scale Integrated circuit construction currently favored in the art.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. Apparatus for converting (numbers) number representations between positive and negative radices comprising
   - a plurality of logic means responsive to the respective digits of said number representations in one of said radices for providing the respective digits of the converted number representations in the other of said radices,
   - a plurality of first gating means responsive to the respective digits of the even orders of said number representations in said one of said radices, and
   - a plurality of second gating means different from said first gating means and responsive to the respective digits of the odd orders of said number representations in said one of said radices,
   - each said first gating means and each said logic means associated with a particular even order of said number representations being responsive to the output of said second gating means associated with the odd order preceding said particular even order,
   - each said second gating means and each said logic means associated with a particular odd order of said number representations being responsive to the output of said first gating means associated with the even order preceding said particular odd order.

2. The apparatus of claim 1 in which
   - each said logic means comprises EXCLUSIVE OR logic means,
   - each said first gating means comprises AND gating means, and
   - each said second gating means comprises OR gating means.

3. The apparatus of claim 2 for converting said number representations from a positive to a negative radix in which
   - said one of said radices comprises said positive radix and said other of said radices comprises said negative radix,
   - each said AND gating means comprises a gate for providing the logical product of its inputs, and
   - each said OR gating means comprises a gate for providing the logical sum of its inputs.

4. The apparatus of claim 2 for converting said number representations from a negative to a positive radix in which
   - said one of said radices comprises said negative radix and said other of said radices comprises said positive radix, and
   - each said AND gating means comprises means for inverting said digit of said associated even order and a gate responsive to said inverting means for providing the logical product of said inverted digit with the other input of said gate.

5. Apparatus for converting number representations between positive and negative radices in accordance with a control signal comprising
   - a plurality of first logic means responsive to the respective digits of said number representations in one of said radices for providing the respective digits of the converted number representations in the other of said radices,
   - a plurality of second logic means responsive to the respective digits of the even orders of said number representations in said one of said radices and to said control signal for selectively providing said digits or the inverses thereof respectively in accordance with said control signal,
   - a plurality of first gating means responsive to said plurality of second logic means respectively, and
   - a plurality of second gating means different from said first gating means and responsive to the respective digits of the odd orders of said number representations in said one of said radices,
   - each said first gating means and each said first logic means associated with a particular even order of said number representations being responsive to the output of said second gating means associated with the odd order preceding said particular even order,
   - each said second gating means and each said first logic means associated with a particular odd order of said number representations being responsive to the output of said first gating means associated with the even order preceding said particular odd order.

6. The apparatus of claim 5 in which each said first and second logic means comprises EXCLUSIVE OR logic means, each said first gating means comprises AND gating means, and each said second gating means comprises OR gating means.

* * * * *